(12) United States Patent
Pang et al.

(10) Patent No.: US 8,412,943 B2
(45) Date of Patent: Apr. 2, 2013

(54) TWO-WAY ACCESS AUTHENTICATION METHOD

(75) Inventors: Liaojun Pang, Xi'an (CN); Jun Cao, Xi'an (CN); Manxia Tie, Xi'an (CN); Zhenhai Huang, Xi'an (CN)

(73) Assignee: China Iwncomm Co., Ltd., Xi'an (CN)

( * ) Notice: Subject to any disclaimer, the term of this patent is extended or adjusted under 35 U.S.C. 154(b) by 271 days.

(21) Appl. No.: 12/741,982

(22) PCT Filed: Nov. 7, 2008

(86) PCT No.: PCT/CN2008/072980
§ 371 (c)(1),
(2), (4) Date: May 7, 2010

(87) PCT Pub. No.: WO2009/067902
PCT Pub. Date: Apr. 6, 2009

(65) Prior Publication Data
US 2010/0250952 A1  Sep. 30, 2010

(30) Foreign Application Priority Data

Nov. 8, 2007  (CN) .......................... 2007 1 0019024

(51) Int. Cl.
*H04L 29/00* (2006.01)
(52) U.S. Cl. .......................... 713/176; 713/150; 713/168
(58) Field of Classification Search .................. 713/150, 713/168
See application file for complete search history.

(56) References Cited

U.S. PATENT DOCUMENTS
6,856,800 B1   2/2005  Henry et al.
(Continued)

FOREIGN PATENT DOCUMENTS
CN   1426200 A   6/2003
CN   1668005 A   9/2005
(Continued)

OTHER PUBLICATIONS

Russian Decision on Grant regarding Application No. 2010123004, dated Aug. 26, 2011. Translation provided by Unitalen Attorneys At Law.

(Continued)

*Primary Examiner* — Ghazal Shehni
(74) *Attorney, Agent, or Firm* — Harness, Dickey & Pierce, P.L.C.

(57) ABSTRACT

A two-way access authentication method comprises: According to the system parameters pre-established by the third entity, the first entity sends the access authentication request packet to the second entity, then the second entity validates whether the signature of first entity is correct, and if yes, the share master key of second entity is calculated; the second entity generates the access authentication response packet and sends it to the first entity, then the first entity validates whether the signature of access authentication response packet and the message integrity check code are correct; if yes, the share master key of first entity is calculated; the first entity sends the access authentication acknowledge packet to the second entity, then the second entity validates the integrity of the access authentication acknowledge packet, if passing the validation, the share master key of first entity is consistent with that of the second entity, and the access authentication is achieved. For improving the security, after received the access authentication request packet sent by the first entity, the second entity may perform the identity validity validation and generates the access authentication response packet after passing the validation.

6 Claims, 1 Drawing Sheet

U.S. PATENT DOCUMENTS

| | | | |
|---|---|---|---|
| 7,174,456 B1 | 2/2007 | Henry et al. | |
| 8,225,092 B2 | 7/2012 | Lal et al. | |
| 2003/0028771 A1* | 2/2003 | Kocher et al. | 713/172 |
| 2006/0143458 A1* | 6/2006 | Tie et al. | 713/176 |
| 2006/0291661 A1* | 12/2006 | Ramzan et al. | 380/277 |

FOREIGN PATENT DOCUMENTS

| | | |
|---|---|---|
| CN | 101018129 A | 8/2007 |
| CN | 101056177 A | 10/2007 |
| CN | 101056456 A | 10/2007 |
| CN | 101159549 A | 4/2008 |
| EP | 1589695 A1 | 10/2005 |
| EP | 1852999 A1 | 11/2007 |
| JP | 4117826 A | 4/1992 |
| JP | 2006025298 A | 1/2006 |
| JP | 2006505203 A | 2/2006 |
| RU | 2308080 C2 | 10/2007 |
| WO | WO-02086725 A1 | 10/2002 |
| WO | WO-2005004498 A1 | 1/2005 |
| WO | WO-2006048043 A1 | 5/2006 |
| WO | WO-2006086932 A1 | 8/2006 |
| WO | WO-2007059419 A2 | 5/2007 |
| WO | WO-2007080289 A1 | 7/2007 |

OTHER PUBLICATIONS

Japanese Office Action regarding Application No. 2010-532414, dated Oct. 23, 2012. Partial translation provided by Unitalen Attorneys at Law.

Hiroyuki Sugiyama et al. "Design and Implementation of User-Authentication System in Distributed Systems." NTT Human Interface Laboratories. NTT Multimedia Systems Department. 1996.

"Survey on 'Status of Identity Authentication Technologies.'" Security Center of Information-technology Promotion Agency, Japan. Mar. 2003. Translation provided by Unitalen Attorneys at Law.

D.W. Davies and W.L. Price. "Network Security." Japan, Nikkei McGraw-Hill. Dec. 1985, first edition, first printing. pp. 126-129. Translation provided by Unitalen Attorneys at Law.

Shigeo Tsuju and Masao Kasahara. "Encryption and Information Security." Japan. Shokodo Co., Ltd. Feb. 20, 1996, first edition, fourth printing. pp. 139-141. Translation provided by Unitalen Attorneys at Law.

* cited by examiner

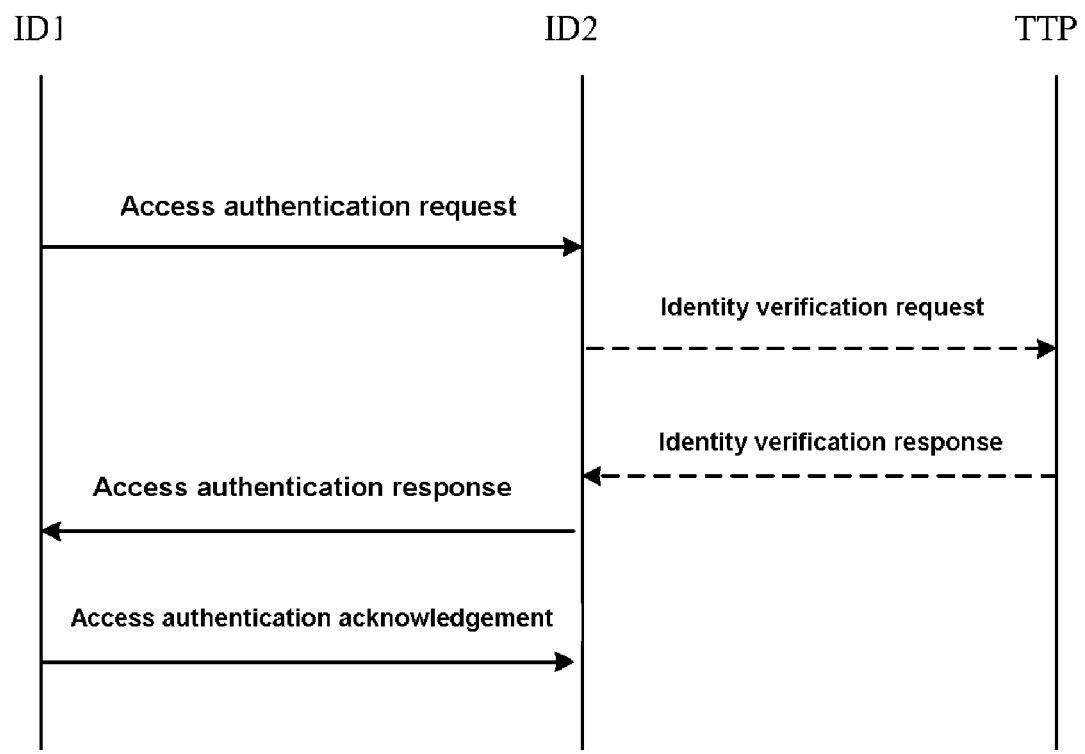

TWO-WAY ACCESS AUTHENTICATION METHOD

This application claims the priority to Chinese Patent Application No. 200710019024.1, filed with the Chinese Patent Office on Nov. 8, 2007 and titled "a two-way access authentication method", which is hereby incorporated by reference in its entirety.

FIELD OF THE INVENTION

The present invention relates to the field of wireless communications and in particular to a two-way access authentication method.

BACKGROUND OF THE INVENTION

In the technology of Radio-Frequency Identification (RFID), secure authentication between the reader/writer and the electronic tag has to be fully addressed prior to secure communication. In wireless networks, the communication between mobile terminals and access points or base stations faces the same challenge, e.g., secure authentication between mobile terminals and access points in a wireless local area network (WLAN), and secure authentication between mobile terminals and base stations in a wireless metropolitan area network (WMAN).

A series of standards such as 802.11 and 802.16 have been established by the IEEE to enhance security of WLANs and WMANs, providing secure access by mobile terminals to base stations or access points. Subsequently, the standards of 802.11i and 802.16e are developed as an amendment to address security vulnerabilities in 802.11 and 802.16, respectively.

However, the inventors found in their studies that, existing two-way authentication methods are based on authentication servers, and can not realize direct two-way authentication between base stations or access points and mobile terminals. That is, to perform two-way authentication between a base station or access point and a mobile terminal, a secure channel has to be pre-established using some other security protocol between the access point or base station and an authentication server, then, the authentication server helps perform two-way authentication between the base station or access point and the mobile terminal. Any problem of the security of the secure channel may degrade the reliability of two-way authentication. Moreover, if a new base station or access point is to be added to the network system, a secure channel has to be set up manually between the base station or access point and the authentication server, which results in difficulty in extending the network system.

SUMMARY OF THE INVENTION

Embodiments of the invention provide a two-way access authentication method, to ensure reliability of two-way access authentication.

An embodiment of the invention provides a two-way access authentication method, including: sending by a first entity an access authentication request message to a second entity according to system parameters predefined by a third entity, and verifying by the second entity a signature signed by the first entity and if the signature is correct, calculating by the second entity a shared master key of the second entity, wherein the system parameters comprise a product N of two large prime numbers, an integer e satisfying $\gcd(e, \phi(N))=2$, an integer d satisfying $ed \equiv 1 (\mod \phi(N))$ and a strong one-way hash function h, with $\phi(\ )$ being the Euler's totient function;

generating by the second entity an access authentication response message, sending by the second entity the access authentication response message to the first entity, and verifying by the first entity a signature and a message integrity check code of the access authentication response message, and if the signature and the message integrity check code of the access authentication response message are both correct, calculating by the first entity a shared master key of the first entity; and sending by the first entity an access authentication acknowledgement message to the second entity, verifying by the second entity integrity of the access authentication acknowledgement message, and if the verification is passed, the shared master keys of the first and second entities are consistent, thereby accomplishing access authentication.

Preferably, the verifying by the first entity the signature and the message integrity check code of the access authentication response message includes: determining whether a random number used by the second entity in the access authentication response message is a random number generated by the first entity; if so, determining whether the equation $s^e \equiv ID2 \cdot t)^{h(r\|M)}$ (mod N) is true; and if the equation is true, determining whether a message integrity check code of a field Sig2 and all previous fields of the field Sig2 in the access authentication response message is valid.

Preferably, verifying by the second entity integrity of the access authentication acknowledgement message includes: verifying whether a random number used by the first entity in the access authentication acknowledgement message is a random number generated by the second entity; and if so, determining whether a message integrity check code of a field N2 and all previous fields of the field N2 in the access authentication acknowledgement message is valid.

An embodiment of the invention further discloses a two-way access authentication method including: sending by a first entity an access authentication request message to a second entity according to system parameters predefined by a third entity, and verifying by the second entity a signature signed by the first entity, and if the signature is correct, calculating by the second entity a shared master key of the second entity, wherein the system parameters comprise a product N of two large prime numbers, an integer e satisfying $\gcd(e, \phi(N))=1$, an integer d satisfying $ed E \equiv 1 (\mod \phi(N))$ and a strong one-way hash function h, with $\phi(\ )$ being the Euler's totient function; sending by the second entity an identity verification request message to a third entity, verifying by the third entity validity of identities of the first and second entities and sending an identity verification response message to the second entity, and verifying by the second entity the identity of the first entity according to the identity verification response message; if the identity of the first entity is correct, generating by the second entity an access authentication response message, and sending by the second entity the access authentication response message to the first entity, and verifying by the first entity a signature and a message integrity check code of the access authentication response message, and if the signature and the message integrity check code of the access authentication response message are both correct, calculating by the first entity a shared master key of the first entity; and sending by the first entity an access authentication acknowledgement message to the second entity, verifying by the second entity integrity of the access authentication acknowledgement message, and if the verification is passed, the shared master keys of the first and second entities are consistent, thereby accomplishing access authentication.

Preferably, the verifying by the first entity the signature and the message integrity check code of the access authentication response message includes: determining whether a random number used by the second entity in the access authentication response message is a random number generated by the first entity; if so, determining whether the equation $s^e \equiv ID2 \cdot t^{h(t\|M)}$ (mod N) is true; and if the equation is true, determining whether the message integrity check code of a field Sig2 and all previous fields of the field Sig2 in the access authentication response message is valid.

Preferably, the verifying by the second entity integrity of the access authentication acknowledgement message includes: verifying whether a random number used by the first entity in the access authentication acknowledgement message is a random number generated by the second entity; and if so, determining whether a message integrity check code of a field N2 and all previous fields of the field N2 in the access authentication acknowledgement message is valid.

As can be seen from the foregoing embodiments of the invention, the authentication between the first entity and the second entity does not require an authentication server, it is not necessary to set up a secure channel between the third entity and the first and second entities either, and the first and second entities can directly perform two-way authentication. Moreover, identity-based public key mechanism and WAPI background identity validity verification mechanism are combined, providing the following advantages: 1. reduced maintenance workload: unlike traditional digital certificate based public key mechanism, the identity-based public key mechanism of the present invention does not require maintenance of a Public Key Infrastructure (PKI); 2. reduced communication overhead: digital certificates are not needed to be transmitted during authentication, thereby reducing communication overhead; 3. the disadvantage of identity-based public key mechanism that the validity of identities are hard to be verified can be avoided with the combination of WAPI identity verification mechanism; 4. unlike WAPI, TTP signature during identity verification can be done with traditional public key algorithms, or with identity-based public key algorithms. 5. wide application: authentication can be performed according to the invention in all sorts of wired an wireless networks involving two-way authentication.

BRIEF DESCRIPTION OF THE DRAWINGS

FIG. 1 illustrates a flow chart of a two-way access authentication method according to an embodiment of the invention.

DETAILED DESCRIPTION OF THE INVENTION

A method according to the invention is implemented with a Trusted Third Party (TTP), which may be an authentication server or any other authentication enabling devices. The TTP is responsible for physical identification of the identity of a user entity, generating system parameters and setting up user parameters.

Reference is made to FIG. 1 illustrating a flow chart of two-way access authentication method according to an embodiment of the invention. A specific implementation is described as follows:

Step 1: firstly, a TTP sets up system parameters, which include:

N: the product of two large prime numbers;

e: an integer satisfying $gcd(e, \phi(N))=1$, with $\phi(\ )$ being the Euler's totient function;

d: an integer satisfying ed 1(mod $\phi(N)$); and a strong one-way hash function $h:\{0,1\}^* \rightarrow Z_{\phi(N)}$.

And d is the system's private key, i.e. a master key, and (N,e,h) are parameters that may be published.

The TTP is responsible for keeping the system private key d secret.

Each user entity may calculate its own private key via the TIP. Particularly, assume that IDi represents an identity that can uniquely identify a user entity i. Therefore, after physical identification of the identity of the user entity I, the TTP generates for the user entity a private key as $g_i \leftarrow IDi^d (\mod N)$, where i=1, 2.

The foregoing step is performed in first use, and when the system parameters are set, it is not necessary to perform this step repeatedly in subsequent processes.

Step 2) A first entity sends an access request message to a second entity, the second entity verifies a signature of the first entity, and if the signature is right, a shared master key of the second entity is calculated.

In the foregoing step, the access request message includes the fields of:

| ID1 | ID2 | N1 | TPK1 | Sig1 |
|---|---|---|---|---| where:

Field ID1: identity information of the first entity;

Field ID2: identity information of the second entity;

Field N1: a random number generated by the first entity;

Field TPK1: a temporary public key $Y_1$ for D-H key exchange that is chosen by the first entity, and have a corresponding private key $X_1$; and Field Sig1: a signature signed by the first entity of the field TPK1 and all previous fields of the field TPK1, in the form of: (s, t). It is calculated as follows: suppose M is the field TPK1 and all previous fields of the field TPK1 of the message, then we have $t=r^e (\mod N)$ and $s=g_1 \cdot r^{h(t\|M)} (\mod N)$.

Step 3) the second entity generates an access authentication response message and sends the access authentication response message to the first entity, the first entity verifies a signature and a message integrity check code of the access authentication response message sent by the second entity, and if they are right, a shared master key of the first entity, MK, is calculated.

In the foregoing step, the access authentication response message includes the fields of:

| ID1 | ID2 | N1' | N2 | TPK2 | Sig2 | MIC1 |
|---|---|---|---|---|---|---| where:

Field ID1: the identity information of the first entity;

Field ID2: the identity information of the second entity;

Field N1': a random number used by the second entity;

Field N2: a random number generated by the second entity;

Field TPK2: a temporary public key $Y_2$ for D-H key exchange that is chosen by the second entity, and have a corresponding private key $X_2$;

Field Sig2: a signature signed by the second entity of the field TPK2 and all previous fields of the field TPK2, in the form of (s, t). It is calculated as follows: suppose M is the field TPK2 and all previous fields of the field TPK2 of the message, then we have $t=r^e (\mod N)$ and $s=g_2 \cdot r^{h(t\|M)} (\mod N)$; and Field MIC1: a message integrity check code of the field Sig2 and all previous fields of the field Sig2, with an integrity check key derived from the master key MK.

The first entity verifying the signature and the message integrity check code of the access authentication response message sent by the second entity includes: the first entity determines whether the random number N1' used by the second entity in the access authentication response message is the random number generated by the first entity itself, and if not, the message is discarded; if so, the first entity determines whether the equation $S^e \equiv ID2 \cdot t^{h(t||M)} \pmod{N}$ is true, and if not, the message is discarded; if it is true, the first entity calculates a shared master key MK from $(X_1, Y_2)$, and determines whether MIC1 is valid, and if not, the message is discarded; if it is valid, authentication of the second entity succeeds, and the shared master key MK is used as a negotiated master key, which may be used for further deriving an encryption key and an integrity check key.

Step 4) the first entity sends an access authentication acknowledgement message to the second entity, the second entity verifies the integrity of the access authentication acknowledgement message, and if the verification is passed, then the shared master keys of the first and second entities are consistent, and access authentication is accomplished.

In the foregoing step, the access authentication acknowledgement message includes the fields of:

| ID1 | ID2 | N1 | N2' | MIC2 |
| --- | --- | --- | --- | --- | where:
Field ID1: the identity information of the first entity;
Field ID2: the identity information of the second entity;
Field N1: the random number used by the first entity;
Field N2': a random number used by the first entity; and
Field MIC2: a message integrity check code of the field N2 and all previous fields of the field N2, with an integrity check key derived from the master key MK.

Upon reception of the access authentication acknowledgement message sent by the first entity, the second entity determines whether the random number N2' used by the first entity is the random number generated by the second entity itself, and if not, the message is discarded; if so, the second entity determines from the integrity check key derived from the master key MK whether MIC2 is valid, and if not, the message is discarded; if it is valid, authentication succeeds and MK is a negotiated master key.

By the foregoing process, the first and second entities set up a shared master key MK and accomplish two-way authentication.

For further security improvements, upon reception of the access authentication request message sent by the first entity, the second entity may further verify the validity of the identity of the first entity, and if the verification of the identity of the first entity is passed, the second entity may send the access authentication response message to the first entity. Therefore, the following steps may be included between the steps 2) and 3):

Step 11) the second entity sends an identity verification request message to the TTP, and the TTP verifies the validity of the identities of the first and second entities, the identity verification request message including the fields of:

| ID1 | ID2 | TTP | N1 | N2 |
| --- | --- | --- | --- | --- | where:
Field ID1: the identity information of the first entity;
Field ID2: the identity information of the second entity;
Field TTP: the TTP responsible for verifying the validity of the identity of the device;
Field N1: the random number used by the first entity; and
Field N2: the random number used by the second entity.

Step 21) the TTP generates according to a verification result an identity verification response message, and sends the identity verification response message to the second entity, the second entity verifies the identity of the first entity according to the identity verification response message, and if it is correct, step 3) is performed. The identity verification response message includes the fields of:

| ID1 | ID2 | TTP | N1 | N2 | RES1 | RES2 | SigTTP |
| --- | --- | --- | --- | --- | --- | --- | --- | where:
Field ID1: the identity information of the first entity;
Field ID2: the identity information of the second entity;
Field TTP: the TTP responsible for verifying the validity of the identity of the device;
Field N1: the random number generated by the first entity;
Field N2: the random number generated by the second entity;
Field RES1: a result from the verification by the Trp to the validity of the identity of the first entity;
Field RES2: a result from the verification by the TTP to the validity of the identity of the second entity; and
Field SigTTP: a signature signed by the TTP of the field RES2 and all previous fields of the field RES2, which may be a traditional PKI-based signature or an identity-based signature.

Upon reception of the identity verification request message sent by the second entity, the TTP verifies the identities of the first and second entities, and encapsulates verification results in the identity verification response message and sends it to the second entity. The identity verification response message is paired with the identity verification request message. The second entity may determine the validity of the identity of the first entity according to the field RES1 and the field SigTTP in the identity verification response message.

Then, the access authentication response message sent by the second entity to the first entity in step 3) includes the fields of:

| ID1 | ID2 | N1' | N2 | TPK2 | Sig2 | MIC1 | RES1 | RES2 | SigTTP |
| --- | --- | --- | --- | --- | --- | --- | --- | --- | --- |

Where:
Field ID1: the identity information of the first entity;
Field ID2: the identity information of the second entity;
Field N1': the random number used by the second entity;
Field N2: the random number generated by the second entity;
Field TPK2: the temporary public key $Y_2$ for D-H key exchange chosen by the second entity and having a corresponding private key $X_2$;

Field Sig2: the signature signed by the second entity of the field TPK2 and all previous fields of the field TPK2, in the form of (s, t). It is calculated as follows: suppose M is the field TPK2 and all previous fields of the field TPK2 of the message, then we have $t=r^e \pmod N$ and $s=g_2 \cdot r^{h(t\|M)} \pmod N$;

Field MIC1: the message integrity check code of the field Sig2 and all previous fields of the field Sig2, with the integrity check key derived from the master key MK;

Field RES1: the result from the verification by the TTP to the validity of the identity of the first entity;

Field. RES2: the result from the verification by the TTP to the validity of the identity of the second entity; and Field SigTTP: the signature signed by the TTP of the field RES2 and all previous fields of the field RES2.

Upon reception of the access authentication response message sent by the second entity, the first entity determines whether the random number N1' used by the second entity is the random number generated by the first entity itself, and if not, the message is discarded; if so, the first entity determines whether the equitation $s^e \equiv ID2 \cdot t^{h(t\|M)} \pmod N$ is true, and if not, the message is discarded; if it is true, the first entity calculates a shared master key MK from $(X_1, Y_2)$, and determines whether MIC1 is valid, and if not, the message is discarded; if it is valid, authentication of the second entity succeeds, and the shared master key MK is used as a negotiated master key, which may be used for further deriving an encryption key and an integrity check key.

The first entity may determine the validity of the identity of the second entity according to the field RES2 and the field SigTTP in the access authentication response message.

Then, the access authentication acknowledgement message sent by the first entity to the second entity in step 4) includes steps of:

| ID1 | ID2 | N1 | N2' | MIC2 |
| --- | --- | --- | --- | --- | where:

Field ID1: the identity information of the first entity;
Field ID2: the identity information of the second entity;
Field N1: the random number generated by the first entity;
Field N2': a random number used by the first entity; and
Field MIC2: a message integrity check code of the field N2 and all previous fields of the field N2, with an integrity check key derived from the master key MK.

Upon reception of the access authentication acknowledgement message sent by the first entity, the second entity determines whether the random number N2' used by the first entity is the random number generated by the second entity itself, and if not, the message is discarded; if so, the second entity determines from the integrity check key derived from the master key MK whether MIC2 is valid, and if not, the message is discarded; if it is valid, authentication succeeds and MK is a negotiated master key.

By the foregoing process, the first and second entities set up a shared master key MK and accomplish two-way authentication.

As can be seen from the foregoing embodiments of the invention, the authentication between the first entity and the second entity does not require an authentication server, it is not necessary to set up a secure channel between the third entity and the first and second entities either, and the first and second entities can directly perform two-way authentication. Moreover, identity-based public key mechanism and WAPI background identity validity verification mechanism are combined, providing the following advantages: 1. reduced maintenance workload: unlike traditional digital certificate based public key mechanism, the identity-based public key mechanism of the present invention does not require maintenance of a Public Key Infrastructure (PKI); 2. reduced communication overhead: digital certificates are not needed to be transmitted during authentication, thereby reducing communication overhead; 3. the disadvantage of identity-based public key mechanism that the validity of identities are hard to be verified can be avoided with the combination of WAPI identity verification mechanism; 4. unlike WAPI, TTP signature during identity verification can be done with traditional public key algorithms, or with identity-based public key algorithms. 5. wide application: authentication can be performed according to the invention in all sorts of wired an wireless networks involving two-way authentication.

The invention claimed is:

1. A two-way access authentication method, comprising by a first entity an access authentication request message to a second entity according to system parameters predefined by an authentication server, and verifying by the second entity a signature signed by the first entity and if the signature is correct, calculating by the second entity a shared master key of the second entity, wherein the system parameters comprise a product N of two large prime numbers, an integer e satisfying $\gcd(e,\phi(N))=1$ an integer d satisfying $ed \equiv 1 \pmod{\phi(N)}$ and a strong one-way hash function h, with $\phi( )$ being the Euler's totient function, wherein the integer d is the system's private key which is secretly maintained by the authentication server, the authentication server generates for the ith entity a private key as $g_i \leftarrow IDi^d \pmod N$, where IDi represents an identity of the ith entity, and i=1, 2;

generating by the second entity an access authentication response message, sending by the second entity the access authentication response message to the first entity, and verifying by the first entity a signature and a message integrity check code of the access authentication response message, and if the signature and the message integrity check code of the access authentication response message are both correct, calculating by the first entity shared master key of the first entity; and sending by the first entity an access authentication acknowledgement message to the second entity, verifying by the second entity integrity of the access authentication acknowledgement message, and if the verification is passed, the shared master keys of the first and second entities are consistent, thereby accomplishing access authentication.

2. The method according to claim 1, wherein the verifying by the first entity the signature and the message integrity check code of the access authentication response message comprises:

determining whether a random number used by the second entity in the access authentication response message is a random number generated by the first entity;

if so, determining whether the equation $s^e \equiv ID2 \cdot t^{h(t\|M)} \pmod N$ is true;

and if the equation is true, determining whether a message integrity check code of a field Sig2 and all previous fields of the field Sig2 in the access authentication response message is valid.

3. The method according to claim 1, wherein verifying by the second entity integrity of the access authentication acknowledgement message comprises:

verifying whether a random number used by the first entity in the access authentication acknowledgement message is a random number generated by the second entity; and if so, determining whether a message integrity check code of a field N2 and all previous fields of the field N2 in the access authentication acknowledgement message is valid.

4. A two-way access authentication method, comprising by a first entity an access authentication request message to a second entity according to system parameters predefined by an authentication server, and verifying by the second entity a signature signed by the first entity, and if the signature is correct, calculating by the second entity a shared master key of the second entity, wherein the system parameters comprise a product N of two large prime numbers, an integer e satisfying $\gcd(e,\phi(N))=1$ an integer d satisfying $ed \equiv 1 (\mod \phi(N))$ and a strong one-way hash function h, with $\phi()$ being the Euler's totient function, wherein the integer d is the system's private key which is secretly maintained by the authentication server, the authentication server generates for the ith entity a private key as $g_i \leftarrow IDi^d \pmod{N}$, where IDi represents an identity of the ith entity, and i=1, 2;

sending by the second entity an identity verification request message to the authentication server, verifying by the authentication server validity of identities of the first and second entities and sending an identity verification response message to the second entity, and verifying by the second entity the identity of the first entity according to the identity verification response message;

if the identity of the first entity is correct, generating by the second entity an access authentication response message, and sending by the second entity the access authentication response message to the first entity, and verifying by the first entity a signature and a message integrity check code of the access authentication response message, and if the signature and the message integrity check code of the access authentication response message are both correct, calculating by the first entity a shared master key of the first entity; and sending by the first entity an access authentication acknowledgement message to the second entity, verifying by the second entity integrity of the access authentication acknowledgement message, and if the verification is passed, the shared master keys of the first and second entities are consistent, thereby accomplishing access authentication.

5. The method according to claim 4, wherein the verifying by the first entity the signature and the message integrity check code of the access authentication response message comprises:

determining whether a random number used by the second entity in the access authentication response message is a random number generated by the first entity;

if so, determining whether the equation $s^e \equiv ID2 \cdot t^{h(t\|M)} \pmod{N}$ is true; and if the equation is true, determining whether the message integrity check code of a field Sig2 and all previous fields of the field Sig2 in the access authentication response message is valid.

6. The method according to claim 4, wherein the verifying by the second entity integrity of the access authentication acknowledgement message comprises:

verifying whether a random number used by the first entity in the access authentication acknowledgement message is a random number generated by the second entity; and if so, determining whether a message integrity check code of a field N2 and all previous fields of the field N2 in the access authentication acknowledgement message is valid.

* * * * *